(12) United States Patent
Wallentin et al.

(10) Patent No.: US 7,322,595 B2
(45) Date of Patent: Jan. 29, 2008

(54) ELECTRICALLY INSULATED FIXING DEVICE FOR AN AIRBAG MODULE

(75) Inventors: Rainer Wallentin, Hohenkammer (DE); Ernst Wittmann, Hebertshausen (DE)

(73) Assignee: Autoliv Development AB, Vargarda (SE)

( * ) Notice: Subject to any disclaimer, the term of this patent is extended or adjusted under 35 U.S.C. 154(b) by 426 days.

(21) Appl. No.: 10/517,403

(22) PCT Filed: May 22, 2003

(86) PCT No.: PCT/EP03/05340

§ 371 (c)(1),
(2), (4) Date: Dec. 7, 2004

(87) PCT Pub. No.: WO03/104042

PCT Pub. Date: Dec. 18, 2003

(65) Prior Publication Data

US 2005/0253364 A1 Nov. 17, 2005

(30) Foreign Application Priority Data

Jun. 7, 2002 (DE) .................................. 102 25 633

(51) Int. Cl.
*B60R 21/217* (2006.01)
*B60R 21/207* (2006.01)
(52) U.S. Cl. .................................. 280/728.2; 280/730.2
(58) Field of Classification Search .............. 280/728.2, 280/730.2, 741; 307/10.1
See application file for complete search history.

(56) References Cited

U.S. PATENT DOCUMENTS

| | | | |
|---|---|---|---|
| 2,289,734 A * | 7/1942 | Robertson et al. .... 174/121 SR |
| 4,812,670 A * | 3/1989 | Goulet ........................ 307/10.2 |
| 5,234,229 A | 8/1993 | Gordon |
| 5,239,147 A * | 8/1993 | Allard et al. ............. 200/61.54 |
| 5,333,897 A * | 8/1994 | Landis et al. ............. 280/728.2 |
| 5,380,037 A * | 1/1995 | Worrell et al. ........... 280/728.2 |
| 5,503,428 A | 4/1996 | Awotwi et al. |
| 5,645,295 A | 7/1997 | White, Jr. et al. |
| 5,779,263 A | 7/1998 | Lane, Jr. et al. |
| 5,803,486 A | 9/1998 | Spencer et al. |
| 5,931,492 A * | 8/1999 | Mueller et al. .......... 280/728.2 |
| 5,944,342 A | 8/1999 | White, Jr. et al. |
| 5,955,699 A * | 9/1999 | Perotto et al. ............... 102/530 |
| 6,045,151 A | 4/2000 | Wu |
| 6,056,314 A * | 5/2000 | Shirk et al. .............. 280/728.2 |

(Continued)

FOREIGN PATENT DOCUMENTS

EP 0818365 A1 1/1998

(Continued)

*Primary Examiner*—Paul N. Dickson
*Assistant Examiner*—Barry Gooden, Jr.
(74) *Attorney, Agent, or Firm*—Brinks Hofer Gilson & Lione

(57) ABSTRACT

A fastening arrangement for an airbag module in motor vehicles wherein the gas generator is fastened by means of at least one stay bolt and nut screwed thereupon. The bolt is designed for the gas generator and penetrating through at least one hole of a retaining member that serves for mounting the airbag module and fastening to a vehicle part. An electrical insulating shell and washer are arranged between the gas generator and the retaining member to prevent spurious voltage signals from communicating with the gas generator, which can lead to inadvertent airbag deployment.

10 Claims, 1 Drawing Sheet

U.S. PATENT DOCUMENTS

| | | | |
|---|---|---|---|
| 6,062,592 A * | 5/2000 | Sakurai et al. ............ | 280/728.2 |
| 6,073,961 A | 6/2000 | Bailey et al. | |
| 6,146,598 A * | 11/2000 | Duvacquier et al. ........ | 422/166 |
| 6,237,941 B1 | 5/2001 | Bailey et al. | |
| 6,259,167 B1 * | 7/2001 | Norton ...................... | 307/10.1 |
| 6,293,581 B1 | 9/2001 | Saita et al. | |
| 6,382,662 B1 | 5/2002 | Igawa | |
| 6,422,594 B2 * | 7/2002 | Hasebe ....................... | 280/731 |
| 6,508,485 B2 * | 1/2003 | Kikuta et al. ............ | 280/728.2 |
| 6,559,555 B1 * | 5/2003 | Saitou et al. .............. | 307/10.1 |
| 6,960,841 B2 * | 11/2005 | Saitou et al. .............. | 307/10.1 |
| 6,979,021 B2 * | 12/2005 | Young et al. ............... | 280/737 |
| 7,073,819 B2 * | 7/2006 | Castagner et al. ........... | 280/736 |
| 2001/0035631 A1 * | 11/2001 | Hasebe ..................... | 280/728.2 |
| 2002/0020991 A1 | 2/2002 | Tanase et al. | |
| 2003/0015859 A1 * | 1/2003 | Nakazawa ................ | 280/728.2 |
| 2003/0155758 A1 * | 8/2003 | Castagner et al. ............ | 280/741 |
| 2003/0184068 A1 * | 10/2003 | Nakashima et al. ........ | 280/741 |
| 2004/0041372 A1 * | 3/2004 | Helmstetter .............. | 280/728.2 |
| 2004/0041373 A1 * | 3/2004 | Helmstetter et al. ..... | 280/728.2 |
| 2005/0194768 A1 * | 9/2005 | Bonam et al. ........... | 280/728.2 |
| 2005/0212268 A1 * | 9/2005 | Nagy et al. ............... | 280/728.2 |
| 2005/0253364 A1 * | 11/2005 | Wallentin et al. ........ | 280/728.2 |
| 2005/0253457 A1 * | 11/2005 | Pierret et al. .............. | 307/10.1 |
| 2006/0197316 A1 * | 9/2006 | Watanabe ................. | 280/728.2 |
| 2006/0197317 A1 * | 9/2006 | Watanabe ................. | 280/728.2 |
| 2006/0208472 A1 * | 9/2006 | DePottey et al. ........... | 280/739 |
| 2006/0232048 A1 * | 10/2006 | Schneeweiss et al. ... | 280/728.2 |
| 2006/0237950 A1 * | 10/2006 | Worrell et al. ........... | 280/728.2 |
| 2006/0261580 A1 * | 11/2006 | Tiesler et al. ............ | 280/730.2 |

FOREIGN PATENT DOCUMENTS

| | | |
|---|---|---|
| EP | 0826565 A2 | 3/1998 |
| EP | 0940299 A1 | 9/1999 |
| EP | 1122134 A1 | 8/2001 |
| EP | 1270341 A2 | 2/2003 |
| EP | 1433667 A2 | 6/2004 |
| JP | 1999-11-321536 | 11/1999 |
| JP | 2000-85515 A | 3/2000 |
| JP | 2001-114060 A | 4/2001 |
| JP | 2002-503581 A | 2/2002 |
| WO | WO 2005/000639 A1 | 6/2005 |

* cited by examiner

ELECTRICALLY INSULATED FIXING DEVICE FOR AN AIRBAG MODULE

CROSS-REFERENCE TO RELATED APPLICATION

This application claims priority to PCT/EP03/05340, filed May 22, 2003, and DE 102 24 633.0, filed Jun. 7, 2002.

BACKGROUND OF THE INVENTION

The invention relates to a fastening arrangement for an airbag module in motor vehicles, wherein the gas generator of the airbag module is fastened by means of at least one stay bolt and a nut screwed thereupon, the bolt being designed for the gas generator and penetrating through at least one hole of a retaining member that serves for mounting the airbag module and fastening to a vehicle part.

This general type of fastening arrangement is described in U.S. Pat. No. 5,803,486 A for an airbag module fastened to a car seat, wherein stay bolts, which pierce the wall of a post of the seat structure and are fastened thereto by nuts, are attached to the gas generator housing. In this application in car seats, still other electrically operated and controlled components, like retractor, seatbelt tensioner and the like, are often provided and preferably fastened to the integrated seat structure. The problem can appear in the known fastening arrangements for an airbag module, that spurious electrical currents can flow to the gas generator and to its ignition mechanism across the seat structure and the stay bolts of the gas generator giving rise to the possibility of a spurious release of gas from the gas generator. Since these types of spurious releases are undesirable, it is the objective of the invention to provide a fastening arrangement of the aforementioned type that spurious release is prevented.

The solution of this objective, including advantageous embodiments and developments of the invention, is achieved in accordance with this invention.

In its basic idea, the invention provides that an electrical insulation is provided between gas generator and a vehicle part. In an advantageous manner, it is thereby precluded that arising electrical currents are insulated from reaching the gas generator and its ignition mechanism.

SUMMARY OF THE INVENTION

In a first embodiment, the fastening system includes the electrical insulation in the form of a shell, which is made of an electrically insulating material and engages a hole of the retaining member with at least one shoulder and forms an insulation between the stay bolt and the hole edge of the retaining member which surrounds the stay bolt. The shell is arranged extending at least across the contact area between gas generator and retaining member. A bushing also made of an electrically insulating material is arranged on the retaining member between the nut screwed on the stay bolt and the bearing surface of the nut. If the shell insulating the contact surface between generator and retaining member reaches through the hole of the retaining member with a shoulder, then the stay bolt is also insulated from the retaining member in an advantageous manner. The insulation of the nut from the retaining member is further enhanced through the bushing inserted therebetween.

For this, it is additionally provided according to one exemplary embodiment that the shoulder of the shell includes a hook-like radial projection lying on the external side of the retaining member facing away from the gas generator. Preferably it is also provided that the shoulder of the shell having the hook-like projection is resilient and locks with the vehicle part when pushed through the hole of the retaining member.

According to one exemplary embodiment, the invention provides that the radial projection of the shoulder forms a support for the bushing. Alternatively, it may be provided that the bushing engages the projection externally and that its edge lies fully on the retaining member, wherein the inner surface of the bushing engages the projection and the outer surface of the projection may be designed as slanted surfaces that correspond to each other.

An appropriate plastic is preferably used as electrical insulation.

To the extent that it is possible for an electrical charge to develop on the airbag module and no longer be able to automatically discharge itself against the conducting vehicle part because of the insulating connection according to invention, it is provided according to one exemplary embodiment of the invention, that a compound-impregnated cable connects the stay bolt to an electrically conducting vehicle part, so that a static charge in the vicinity of the airbag module is dissipated.

According to one exemplary embodiment of the invention, it is provided that the retaining member serving to fasten the airbag module is fastened to the structure of a car seat. The invention is nevertheless equally applicable to installation situations of airbag modules in which the airbag modules having the integrated retaining member are fastened elsewhere, such as to electrically conducting vehicle parts in the vicinity of the instrument panel. Moreover, the invention is not necessarily restricted to the inclusion of a retaining member, but it may also be provided that the stay bolts of the gas generator or generator housing are guided directly through holes provided in a vehicle part serving for fastening the airbag module, and that the fastening occurs by means of nuts screwed onto the stay bolts, as is described in U.S. Pat. No. 5,803,486 A, which forms the prior art.

BRIEF DESCRIPTION OF THE DRAWINGS

The drawing depicts an exemplary embodiment of the invention, which is described below. The drawing shows.

DETAILED DESCRIPTION OF THE INVENTION

Figure 1:
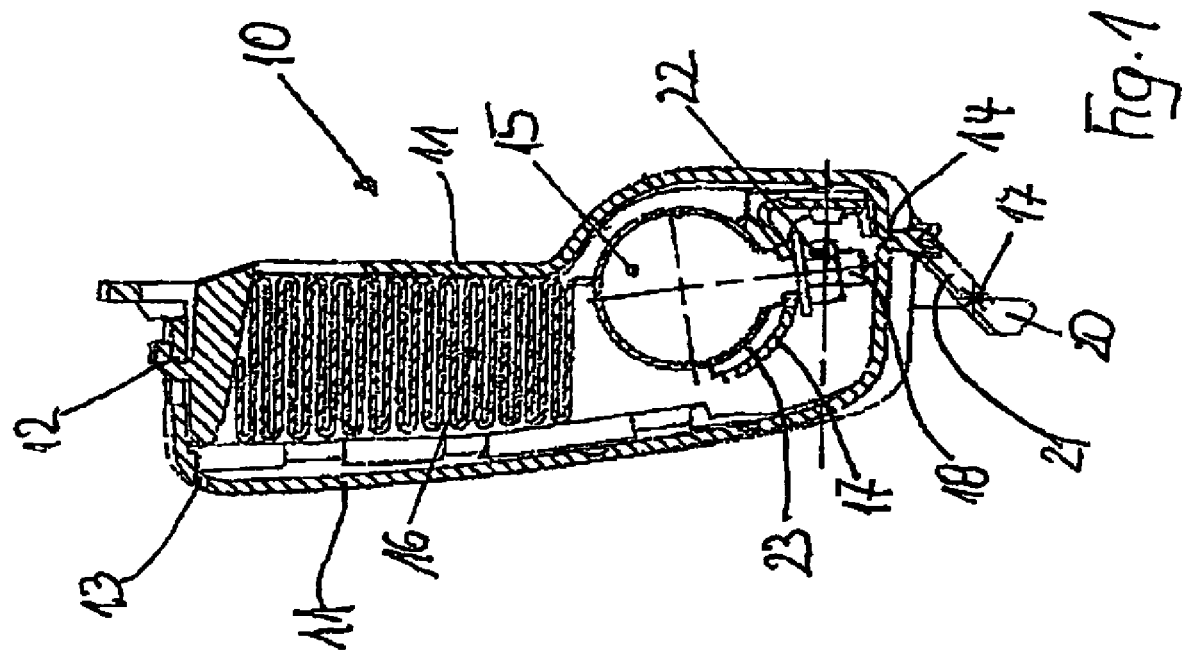
FIG. 1 is a sectional view of an airbag module having a retaining member.

The airbag module 10 depicted in FIG. 1 has two outer housing halves 11a and 11b which are held together by a hinged connection 14 on their one end and a snap connection 12 at their opposite end. Housing half 11b is provided with a predetermined breaking point 13, which is torn open by the inflation pressure of the airbag 16 arranged in the airbag module 10, so that housing half 11b opens itself pivoting around the hinged connection 14.

A gas generator 15 and a folded airbag 16 are arranged in the interior of the airbag module 10. The gas generator 15 is fastened by a stay bolt 18, which is arranged thereon and pierces a retaining member 17 extending into the inside of the airbag module 10. A nut 22 threads onto stay bolt 18 to fix the gas generator 15 to the retaining member 17. The retaining member 17 extends beyond the airbag module 10 and includes a mounting hook 20 and a mounting hole 21 at its end, so that the retaining member 17 may be fastened to a vehicle part, for example to a section of the seat structure as presented in U.S. Pat. No. 5,803,486 Aby means of a suitable fastener.

In order to prevent an electrically conducting connection from the vehicle part or possibly a seat structure to the gas generator 15 and its ignition mechanism through the retaining member 17, the fastening arrangement is provided with electrical insulation. The fastening arrangement consists of stay bolt 18 and nut 22, and further including a shell 23 made of an electrically insulating material, preferably a suitable plastic is arranged in the seating area of the gas generator 15 against the retaining member 17 between gas generator 15 and retaining member 17. The shell 23 insulating the stay bolt 18 is supplemented by a bushing 26 arranged between nut 22 and retaining member 17.

Figure 2:
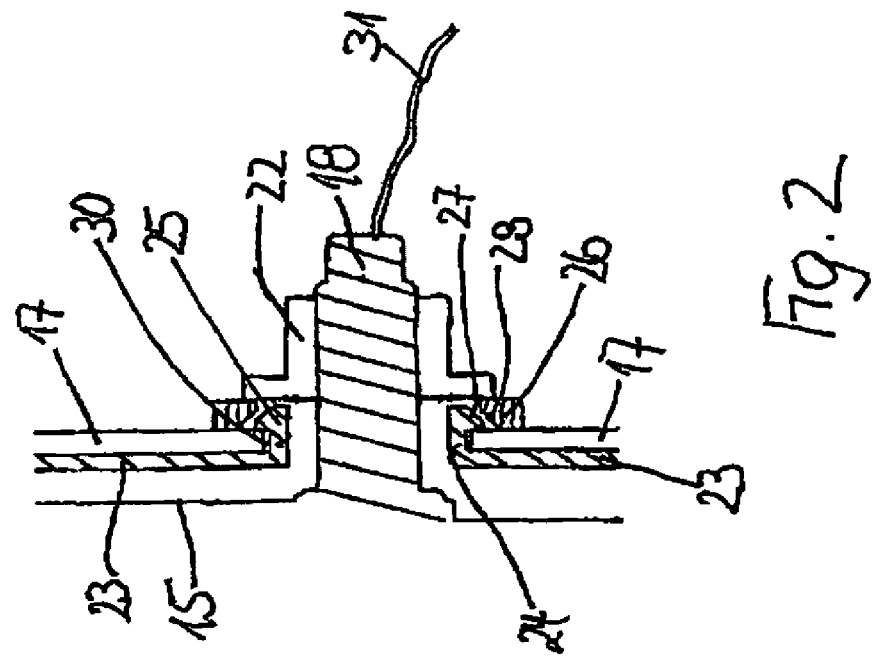
FIG. 2 shows the connection of gas generator and retaining member in an exploded cutout representation.

The electrical insulation in the vicinity of the fastening arrangement of this invention is depicted in detail in FIG. 2. The shell 23, which has a shoulder 24 surrounding the stay bolt 18 is arranged between retaining member 17 and gas generator 15. The shell shoulder 24 pierces the hole 30 in the retaining member 17 and engages the retaining member 17 in a hook-like manner on the side facing away from the gas generator 15 with a radial projection 25 that is directed outwards. This organization ensures that the surfaces of the retaining member 17 toward the stay bolt 18 in the vicinity of the hole 30 are also protected and insulated from the stay bolt, so that no electrically conducting connection between them occurs.

If a nut 22 is screwed onto the stay bolt 18 for fastening purposes, a bushing 26, which is likewise made of electrically insulating material, is also arranged between the nut 22 and the retaining member 17 so that the nut 22 supports itself on the bushing 26 and an electrical connection between the nut 22 and retaining member 17 is prevented. In the embodiment depicted in FIG. 2, the inner surface 28 of the bushing 26 which engages the radial projection 25, and the outer surface 27 of the projection 25, are both designed to have mating slanted surfaces.

The arrangement of shell 23, shoulder 24 and projection 25 is preferably so made, that a locking snap connection results between shell 23 and retaining member 17 during the assembly of the shell 23 to the retaining member 17.

To prevent electrostatic charging of the gas generator, a compound-impregnated cable 31 connects the stay bolt 18 to an electrically conducting vehicle part, so that the electrical isolation between the vehicle part and/or the retaining member 17 connected thereto and the gas generator 15 is bridged thereby.

The characteristics of the object of these documents disclosed in the present description, the claims, the abstract and the drawing may be essential for the realization of the invention in its various embodiments both individually and in various combinations with each other.

While the above description constitutes the preferred embodiment of the present invention, it will be appreciated that the invention is susceptible to modification, variation and change without departing from the proper scope and fair meaning of the accompanying claims.

The invention claimed is:

1. A fastening arrangement for an airbag module for motor vehicles, comprising a gas generator being fastened by means of at least one stay bolt and a nut screwed thereupon, the bolt being fixed to the gas generator and penetrating through at least one hole of a retaining member that serves for mounting and fastening, the airbag module to the motor vehicle, the fastening arrangement comprising a shell formed from an electrical insulating resilient material having a shoulder surrounding the stay bolt and spacing the stay bolt from an edge of the hole, the shoulder having a radial projection engaging the hole and enabling the shell to be snap-fit through the hole and onto the retaining member.

2. A fastening arrangement according to claim 1 wherein the shell is made of a plastic.

3. A fastening arrangement according to claim 1 wherein a compound-impregnated cable connects said stay bolt to an electrically conducting part of the motor vehicle.

4. A fastening arrangement according to claim 1 further comprising the shell separating the gas generator from the retaining member.

5. A fastening arrangement according to claim 1 wherein the shell is positioned such that the radial projection overlies a surface of the retaining member opposite the side of the retaining member facing the gas generator.

6. A fastening arrangement according to claim 1 wherein the fastening arrangement mounts the airbag module to a seat structure of the motor vehicle.

7. A fastening arrangement according to claim 1 wherein the radial projection is hook-like having a slanted outer surface.

8. A fastening arrangement according to claim 7 wherein the hook-like projection is resilient and locks onto the retaining member when pushed through the retaining member hole.

9. A fastening arrangement according to claim 1 further comprising a bushing positioned between the retaining member and the nut.

10. A fastening arrangement according to claim 9 wherein the radial projection forms a slanted outer surface and the bushing forms a slanted inner surface and the slanted surfaces conform with and match together.

* * * * *